(12) United States Patent
Matsuyama

(10) Patent No.: US 9,403,699 B2
(45) Date of Patent: Aug. 2, 2016

(54) ELECTROLYSIS WATER-MAKING APPARATUS

(75) Inventor: Koki Matsuyama, Tokyo (JP)

(73) Assignee: Morinaga Milk Industry Co., Ltd., Tokyo (JP)

( * ) Notice: Subject to any disclaimer, the term of this patent is extended or adjusted under 35 U.S.C. 154(b) by 194 days.

(21) Appl. No.: 13/517,177

(22) PCT Filed: Nov. 19, 2010

(86) PCT No.: PCT/JP2010/070678
§ 371 (c)(1),
(2), (4) Date: Jun. 19, 2012

(87) PCT Pub. No.: WO2011/077875
PCT Pub. Date: Jun. 30, 2011

(65) Prior Publication Data
US 2012/0261255 A1 Oct. 18, 2012

(30) Foreign Application Priority Data
Dec. 25, 2009 (JP) ................................ 2009-296082

(51) Int. Cl.
*C02F 1/461* (2006.01)
(52) U.S. Cl.
CPC ....... *C02F 1/46104* (2013.01); *C02F 2201/002* (2013.01); *C02F 2201/004* (2013.01)
(58) Field of Classification Search
CPC .............. C25B 9/06; C25B 9/18; C25B 9/20; C25B 9/203; C25B 9/206; C02F 1/46; C02F 1/46104
See application file for complete search history.

(56) References Cited

U.S. PATENT DOCUMENTS

| 1,506,307 | A | | 8/1924 | Kirkaldy |
| 4,533,451 | A | * | 8/1985 | Kumazawa ......... C02F 1/46104 204/228.3 |

(Continued)

FOREIGN PATENT DOCUMENTS

| FR | 2709430 A1 | 3/1995 |
| GB | 2186596 A | 8/1987 |

(Continued)

OTHER PUBLICATIONS

International Search Report issued in International Application No. PCT/JP2010/070678, dated Feb. 22, 2011, 4 pages.

(Continued)

*Primary Examiner* — Ciel Thomas
(74) *Attorney, Agent, or Firm* — Wood, Herron & Evans, LLP

(57) ABSTRACT

The invention relates to an electrolysis water-making apparatus where an electrolytic cell in which a unit cell is provided in a casing, is fixed to an installation base by a fixture attached to the electrolytic cell, and, through a pipe group, electrolyte solution is supplied into the electrolytic cell, and electrolyzed products produced in the electrolytic cell are delivered. The electrolysis water-making apparatus is characterized in that: in the installation base, there are formed one or two or more through holes, depending on the size of the electrolytic cell, through which through hole the end part of the fixture can be inserted; an end part of the fixture is inserted through a through hole, which is selected from the one or two or more through holes depending on the size of the electrolytic cell; and an end part of the fixture which projects from the installation base is locked on the installation base. The electrolysis water-making apparatus can be easily produced in a short time, and can be provided at a low price.

11 Claims, 15 Drawing Sheets

(56) References Cited

U.S. PATENT DOCUMENTS

| | | | |
|---|---|---|---|
| 5,389,210 A | 2/1995 | Silveri | |
| 5,538,606 A | 7/1996 | Hishida | |
| 6,193,869 B1* | 2/2001 | Towe et al. | 204/632 |
| 7,326,325 B2* | 2/2008 | Liang et al. | 204/524 |
| 2002/0031697 A1* | 3/2002 | Sugita | H01M 8/0271 429/434 |
| 2004/0045815 A1* | 3/2004 | Tseng et al. | 204/252 |
| 2007/0284251 A1* | 12/2007 | Zuback et al. | 204/518 |
| 2008/0073288 A1* | 3/2008 | Fan et al. | 210/748 |

FOREIGN PATENT DOCUMENTS

| | | | |
|---|---|---|---|
| JP | 04-36736 B | 3/1992 | |
| JP | 06226258 A | 8/1994 | |
| JP | 07-501487 A | 2/1995 | |
| JP | 08103771 A | 4/1996 | |
| JP | 11169856 A | 6/1999 | |
| JP | 2000-504619 A | 4/2000 | |
| JP | 2000355782 A | 12/2000 | |
| JP | 2001062455 A | 3/2001 | |
| JP | 2003190953 A | 7/2003 | |
| JP | 2005138001 A | 6/2005 | |
| JP | 2005161196 A | 6/2005 | |
| JP | 2006167699 A | 6/2006 | |
| JP | 2008-084727 A | 4/2008 | |
| KR | 20030017898 A * | 3/2003 | H02K 15/00 |
| KR | 100458604 B1 | 12/2004 | |
| KR | 100599551 B1 | 7/2006 | |

OTHER PUBLICATIONS

European Patent Office, Search Report issued in Application No. 10839111.1, mailed Sep. 5, 2013, 5 pp.

Japanese Patent Office, Office Action issued in Application No. 2011-547412, mailed Sep. 10, 2013, 3 pp.

Office Action issued in Taiwanese Patent Application No. 099142778; Jun. 10, 2013; 7 pages.

Korean Patent Office, Notice of Allowance issued in Application No. 10-2012-7014290, mailed Mar. 28, 2014, 3 pp.

\* cited by examiner

ELECTROLYSIS WATER-MAKING APPARATUS

TECHNICAL FIELD

The present invention relates to an electrolysis water-making apparatus for making electrolysis water to be used as sterilized water, by means of electrolysis in an electrolyte solution.

Priority is claimed on Japanese Patent Application No. 2009-296082, filed Dec. 25, 2009, the contents of which are incorporated herein by reference.

BACKGROUND ART

In recent years, electrolysis sterilized water is widely used for various sterilizing purposes in the area of food manufacturing. Electrolysis sterilized water in this case is produced by means of electrolysis performed on various types of solutions with use of an electrolysis water-making apparatus. There have been provided conventional electrolysis water-making apparatuses to be used in this type of purpose as disclosed in the following Patent Documents 1 to 3.

Electrolysis water-making devices disclosed in Patent Documents 1 to 3 are provided with: an electrolytic cell in which electrolysis is performed in an electrolyte solution; an installation base of the electrolytic cell and so forth; a water supply system for making an electrolyte solution; a tank for accommodating hydrochloric acid or the like; a mixer; a pump for pressure-pumping treatment water, hydrochloric acid, and so forth; a pipe group which connects these components of the apparatus; and an electrolysis power supply for supplying electric power to the electrolytic cell.

CITATION LIST

Patent Documents

[Patent Document 1] Japanese Unexamined Patent Application, First Publication No. 2006-167699
[Patent Document 2] Japanese Unexamined Patent Application, First Publication No. H11-169856
[Patent Document 3] Japanese Unexamined Patent Application, First Publication No. 2001-62455

DISCLOSURE OF INVENTION

Problems to be Solved by the Invention

Each electrolysis water-making apparatus differs in its manufacturing capacity of electrolyzed water, that is, the amount of electrolysis water the apparatus can make per hour, depending on the requirement of a customer. Therefore, usually in manufacturing this apparatus, an order is received from a customer, the capacity of each element of device is determined based on the order specification, and then, a dedicated component is manufactured and assembled for each constituent of the apparatus.

This also applies to the electrolysis water-making apparatuses disclosed in Patent Documents 1 to 3, and each apparatus is manufactured as a dedicated apparatus to meet the manufacturing capacity of electrolyzed water required by a customer.

Therefore, there is a problem in that the conventional electrolysis water-making apparatus disclosed in Patent Documents 1 to 3 each needs to be manufactured with apparatus components such as electrolytic cell, electrolytic cell installation base, and pipe group made for dedicated specification according to the required manufacturing capacity of electrolyzed water. As a result, manufacturing requires a large amount of work and time, and consequently, the entire manufacturing cost becomes high.

Means to Solve the Problems

In order to solve the above problem, the present invention provides the following means.

Specifically, a first aspect of the present invention is an electrolysis water-making apparatus where an electrolytic cell in which a unit cell is provided in a casing, is fixed to an installation base by a fixture attached to the electrolytic cell, and, through a pipe group, electrolyte solution is supplied into the electrolytic cell, and electrolyzed products produced in the electrolytic cell are delivered. The electrolysis water-making apparatus is characterized in that: in the installation base, there are formed one or two or more through holes, depending on the size of the electrolytic cell, through which through hole the end part of the fixture can be inserted; an end part of the fixture is inserted through a through hole, which is selected from the one or two or more through holes depending on the size of the electrolytic cell; and an end part of the fixture which projects from the installation base is locked on the installation base.

Here, there is no particular limitation on the shape of the one or two or more through holes in the installation base surface, through which the end part of the fixture can be inserted, provided that the electrolytic cell can be fixed on the installation base according to the arbitrary size of the electrolytic cell. The shape of the through holes in the installation base surface may be a long hole shape, and further, long holes may be combined in different directions. For example, they may be provided in a cross shape. Furthermore, in those cases where the shape of the through holes in the installation base surface is not a long hole shape, that is, where they are of a circular shape, it is preferable that two or more through holes are provided in a row so that the electrolytic cell can be fixed on the installation base.

The major axis of the long hole may be set while taking into consideration the element size and shape of the electrolytic cell to be used for the present invention, the size of the fixture to be attached to the electrolytic cell, and the thickness and shape of the spacer. However, the preferred major axis is for example 6.5 mm to 30.5 mm, and more preferably 12.5 mm to 18.5 mm, and at this time, the preferred minor axis is for example 3.5 mm to 12.5, and more preferably 4.5 mm to 10.5 mm. If the through hole in the installation base is of a circular shape, the diameter thereof is preferably 3.5 mm to 12.5, and more preferably 4.5 mm to 10.5 mm.

In those cases where the through holes are provided in a row, the preferred distance between the periphery parts of adjacent through holes is for example 65 mm to 30.5 mm, and more preferably 12.5 mm to 18.5 mm. The number of through holes to be provided in a row may be set while taking into consideration the element size and shape of the electrolytic cell to be used for the present invention, and the size and shape of the fixture to be attached to the electrolytic cell.

A second aspect of the present invention is characterized in that the electrolytic cell is provided with: a casing provided with a cylindrical casing pipe and side plates which block both ends of the casing pipe; a plurality of spacers which are provided in a row along an axial direction in the casing pipe, and which respectively have a hollow structure passing therethrough in the axial direction; and a plurality of electrode plates which are arranged between each of the plurality of spacers and on an outer side of the spacers positioned at both ends, and which cover the hollow structure to thereby provide the interior thereof as a unit cell.

A third aspect of the present invention is characterized in that at least a part of piping of the pipe group comprises a flexible pipe.

A fourth aspect of the present invention is characterized in that a shape of the hole is a cross shape.

Effect of the Invention

According to the electrolysis water-making apparatus of the present invention, the following effect can be achieved by the means described above.

Specifically, according to the electrolysis water-making apparatus of the first aspect of the present invention, as a configuration for fixing the electrolytic cell on the installation base, the end part of the fixture attached to the electrolytic cell, according to the size of the electrolytic cell, is inserted through the through hole selected from one or two or more through holes formed in the installation base and is locked thereon. Therefore there can be achieved an effect such that even if the size of the electrolytic cell differs depending on the volume of the electrolytic cell, each electrolytic cell can be fixed on the common installation base with respect to the electrolytic cell of different size, and also if the required manufacturing capacity of electrolyzed water differs, each electrolytic cell can be fixed on the common installation base with respect to the electrolytic cell of different size, the electrolysis water-making apparatus can be manufactured easily in a short period of time, and it can be provided at low cost.

According to the electrolysis water-making apparatus of the second aspect of the present invention, as a configuration of the electrolytic cell, there is provided a configuration such that inside the casing provided with a cylindrical casing pipe and side plates, there are arranged, along the axial direction of the casing pipe, a plurality of spacers and electrodes each having the same element configuration. Therefore there can be achieved an effect such that by increasing or decreasing the number of the spacers and electrodes, the manufacturing capacity of electrolyzed water of the electrolytic cell can be arbitrarily changed, the electrolytic cells of different production capacities can be manufactured using a plurality of spacers and electrodes each having the same element configuration, and the apparatus can be manufactured easily in a short period of time and can be provided at low cost.

According to the electrolysis water-making apparatus of the third aspect of the present invention, at least a part of the pipe group, which connect the components of the apparatus, comprises a flexible pipe. Therefore there can be achieved an effect such that even if the connecting location between the respective components differs depending on the manufacturing capacity of electrolyzed water of the apparatus, connection of the piping is possible, the apparatus can be easily manufactured in a short period of time without the need for changing the specification of the pipe group according to the manufacturing capacity, and the apparatus can be provided at low cost.

According to the electrolysis water-making apparatus of the fourth aspect of the present invention, the through hole in the installation base, through which the fixture of the electrolytic cell is inserted, is formed in a cross shape. Therefore there can be achieved an effect such that even if the size of the electrolytic cell differs not only in one direction but also in a direction orthogonal thereto, fixation of the electrolytic cell is possible.

EMBODIMENTS FOR CARRYING OUT THE INVENTION

Hereunder, embodiments of an electrolysis water-making apparatus according to the present invention are described, with reference to the drawings. The present invention is not limited by these embodiments.

Figure 1:
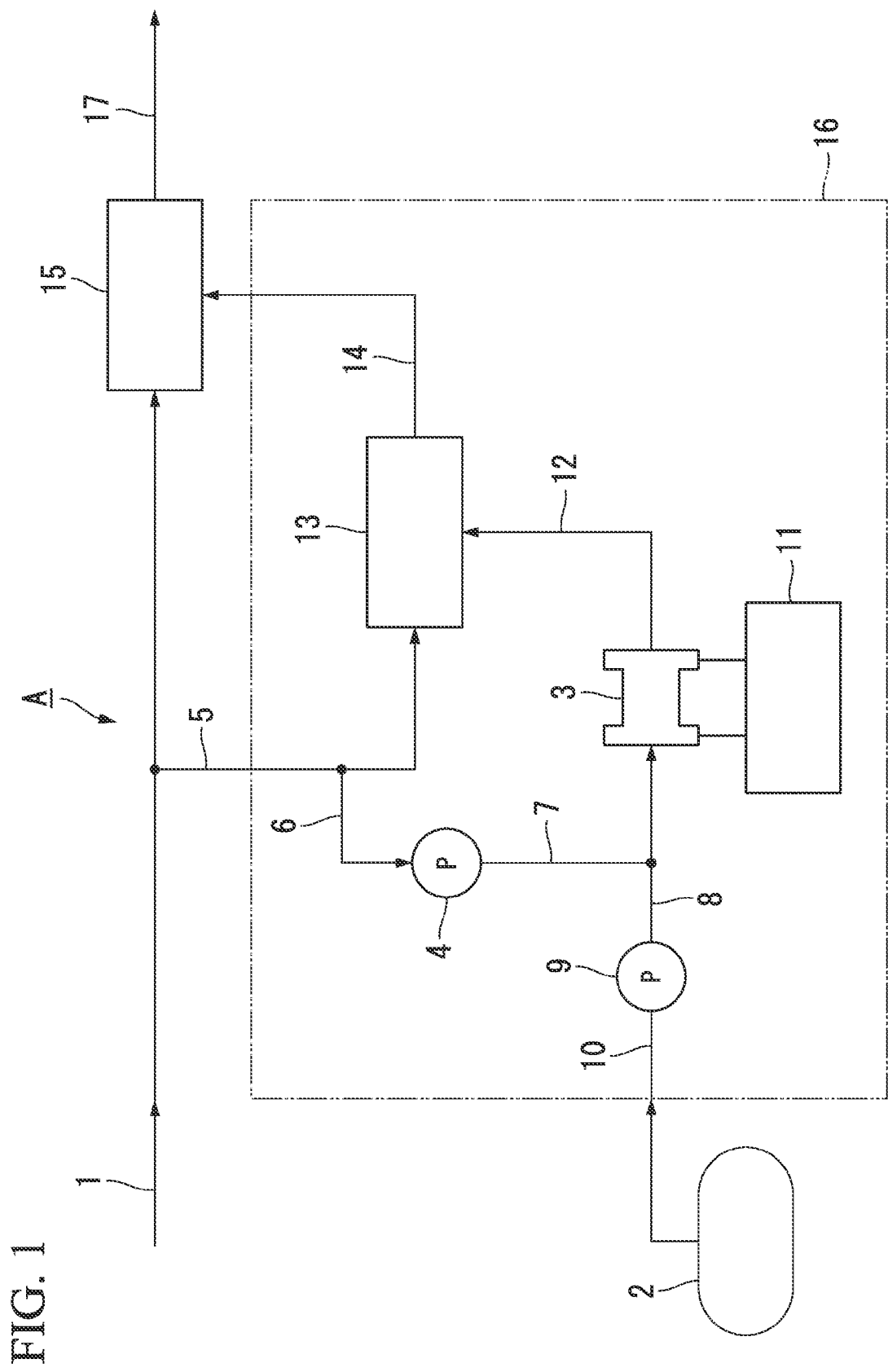
FIG. 1 is a diagram schematically showing a configuration of an electrolysis water-making apparatus of an embodiment of the present invention.

FIG. 1 is a schematic diagram of an electrolysis water-making apparatus A according to the present invention. In this diagram, reference symbol 1 denotes a water supply line for supplying treatment water from a raw water source (not shown in the figure), reference symbol 2 denotes a hydrochloric acid tank, and reference symbol 3 denotes an electrolytic cell.

Treatment water of the water supply line 1 is supplied by a dilution water pump 4, from pipes 5 and 6, through a pipe 7, to a pipe 8.

Hydrochloric acid within the hydrochloric acid tank 2 is supplied by a hydrochloric acid pump 9 from a pipe 10 to the pipe 8.

Hydrochloric acid within the pipe 8 is diluted with the treatment water, and supplied into the electrolytic cell 3 as an electrolyte solution.

Electric power is supplied from an electrolysis power supply 11 to the electrolytic cell 3, so that the electrolyte solution is electrolyzed in the electrolytic cell 3, turning into electrolyzed products (electrolyzed solution and/or electrolyzed gas; examples thereof include hypochlorous acid and/or hydrogen gas) to be supplied through a pipe 12 to a mixer 13. Treatment water is introduced to the mixer 13 from the pipe 5, and in this mixer 13, the treatment water and electrolyzed products are mixed and then supplied through a pipe 14 to a mixer 15. In the case of FIG. 1, the electrolyzed products are hydrogen gas and chlorine gas. The hydrogen gas and chlorine gas produced in the electrolytic cell 3 travel through the pipe 12, and are mixed with water in the mixer 13. As a result, the chlorine is partly dissolved in the water, and thereby becomes chlorine water (strong acidity). In the pipe 14, the hydrogen gas, the remaining chlorine gas which did not dissolve, and the chlorine water are diluted in the mixer 15, and hydrogen gas, which is unlikely to dissolve into hypochlorous acid water (slight acidity) and water, travels through a pipe 17.

As electric power to be supplied from the electrolysis power supply, usually direct current power is used, and the amount of electric power fluctuates depending usually on the size of the electrode plates, the flow rate, and the available chlorine concentration. However, the preferred electric power is 24 VA to 1,872 VA, and more preferably 72 VA to 1,200 VA.

Treatment water is introduced into the mixer 15 from the water supply line 1. In this mixer 15, the concentration of electrolyzed products is adjusted, and the water is then delivered as electrolysis water which can be used as sterilized water, through the pipe 17.

In the above configuration, the electrolytic cell 3, the pumps 4 and 9, the mixer 13, and the respective pipes which connect these components are all housed within a chassis 16.

Figure 2:
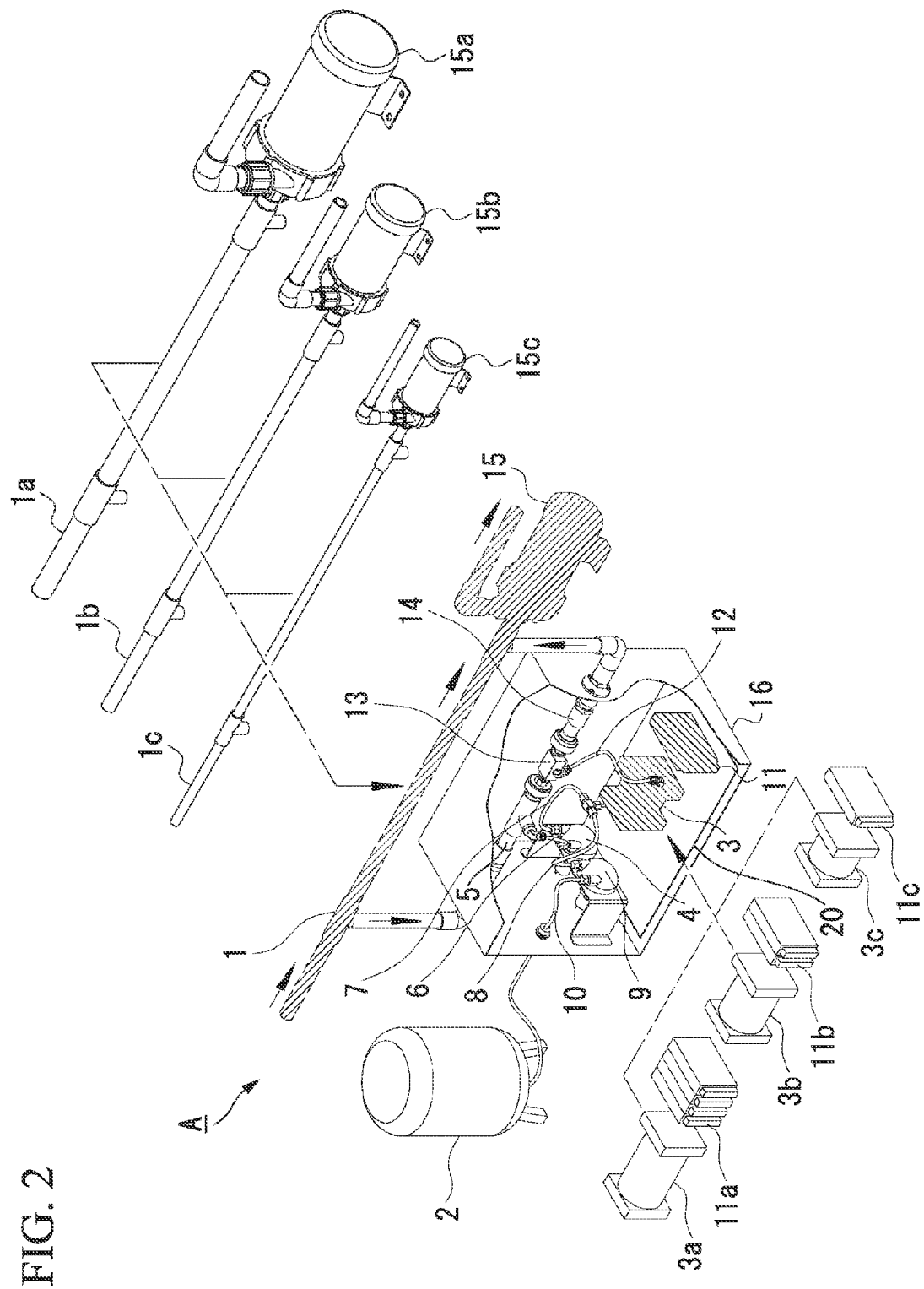
FIG. 2 is a schematic configuration diagram of the electrolysis water-making apparatus of the embodiment of the present invention.

FIG. 2 is a diagram showing a schematic configuration of the electrolysis water-making apparatus A. The same reference symbols in this diagram as those in FIG. 1 denote the same components as those in FIG. 1.

The electrolysis water-making apparatus A is one where, even in a case where the manufacturing capacity of electrolyzed water differs in various types according to the specification required by a customer, common components and various types of components of different production capacities are prepared, to thereby facilitate apparatus production, and reduce production time of the apparatus and cost of the apparatus.

In order to achieve this object, in the electrolysis water-making apparatus A, for the electrolytic cell 3, a plurality of electrolytic cells 3a, 3b, and 3c each having a different manufacturing capacity of electrolyzed water are prepared. The electrolytic cells 3a, 3b, and 3c differ from each other in the size thereof according to their manufacturing capacity. However, by providing a common installation base 20 with respect to the electrolytic cells each having a different manufacturing capacity, that is, each having a different size, each electrolytic cell 3 can be fixed on the installation base 20 by means of the same installation structure (to be described in detail later).

Moreover, also for the electrolysis power supply 11, as with the electrolytic cells 3, there are prepared a plurality of electrolysis power supplies 11a, 11b, and 11c each having a different electric capacity. Any of these electrolysis power supplies 11a, 11b, and 11c each having a different electric capacity, that is, each having a different size, can be fixed on the installation base 20 by means of the same installation structure.

Furthermore, also for the water supply line 1, there are prepared a plurality of water supply lines 1a, 1b, and 1c each having a different water consumption, that is, each having a different size. Also for the mixer 15, there are prepared a plurality of mixers 15a, 15b, and 15c each having a different mixed quantity, that is, each having a different size, in a state of being attached to the respective water supply lines 1a, 1b, and 1c. The preferred water consumption of the water supply line 1 is for example 1,800 L/hr to 1,000,000 L/hr, and more preferably 2,400 L/hr to 20,000 L/hr. Moreover, the preferred mixed quantity of the mixer 15 is for example 240 L/hr to 2,400 L/hr, and more preferably 600 L/hr to 1,200 L/hr.

Furthermore, either one or both of the pipe 7 and pipe 8, or either one or both of these and the pipe 12 are configured with a flexible pipe. Also the other pipes 5, 6, 10, and 14 may respectively be configured with a flexible pipe, so that even if the connecting locations differ due to the different size of the electrolytic cell 3, they can be connected while the direction of extension can be freely changed.

It is preferable that the confluence point of the pipes 7 and 8 is closer to the electrolytic cell, and it is more preferable that the pipes 7 and 8 are directly connected to the electrolytic cell 3 respectively. This type of configuration facilitates flow rate control of hydrochloric acid and water flowing respectively from the pipe 7 and the pipe 8.

Figure 3:
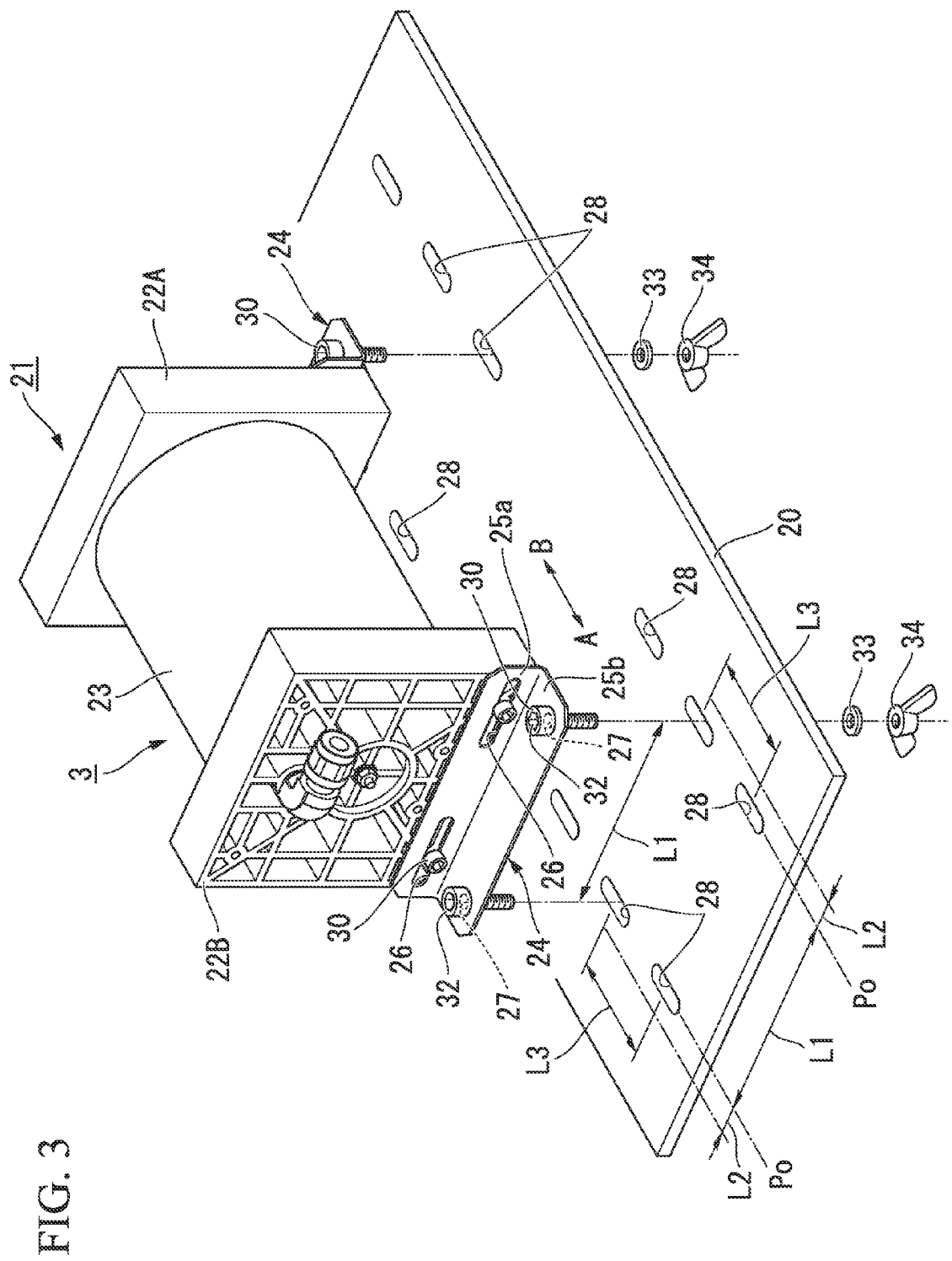
FIG. 3 is an exploded perspective view showing an installation structure of an electrolytic cell shown in FIG. 2.

FIG. 3 is a diagram showing an installation structure of the electrolytic cell 3 (3a, 3b, and 3c).

The electrolytic cell 3 is one where a unit cell, in which electrolysis in an electrolyte solution is performed, is formed within a casing 21. The casing 21 comprises side plates 22A and 22B, and a casing pipe 23. These are formed from a polyvinyl chloride, a polycarbonate, or a plastic such as polyacrylate.

The side plates 22A and 22B are plates having a rectangular plate-shaped appearance with a predetermined thickness. The casing pipe 23 is a member formed in a cylindrical shape, and inside there is formed a unit cell. The side plates 22A and 22B are arranged so as to cover the opening part of both ends, and are fixed on the casing pipe 23.

As described later in the details of this electrolytic cell 3, by increasing or decreasing the number of electrodes to be arranged within the casing pipe 23, it is possible to achieve various types of manufacturing capacities of electrolyzed water. Moreover it is configured so that the lengthwise dimension of the casing pipe 23 differs depending on the number of electrodes.

This electrolytic cell 3 is fixed on the installation base 20 via fittings 24 which are bent in an L shape.

Each fitting 24 is such that in one L-shaped fitting plate part 25a, there are formed long holes 26 which extend in the lengthwise direction, and in the other fitting plate part 25b, there are formed holes 27.

The electrolysis power supply 11 shown in FIG. 2 is fixed on the installation base 20 also by the same structure as with the electrolytic cell 3, however, only the installation structure of the electrolytic cell 3 is described here.

The installation base 20 is formed to allow the electrolytic cell 3 to be fixed thereon according to each dimension thereof, so that even if the lengthwise or widthwise dimension of the casing pipe 23 of the electrolytic cell 3 is different, it can still be commonly used for each electrolytic cell 3 having a different size. The shape of the installation base 20 may be appropriately decided according to the overall design of the electrolysis water-making apparatus.

The installation base 20 is a plate having a certain thickness dimension. Between the plate surfaces thereof, there are formed a plurality of through holes 28 or the like.

There is no particular limitation on the material of the installation base 20 as long as it has strength to stably support members to be installed on the installation base 20, however, a material with superior water resistance and corrosion resistance is preferred.

Specific examples of the material of the installation base 20 include titanium (Ti), stainless steel (SUS), polyvinyl chloride (PVC), iron (SPCC), and aluminum (Al), and stainless steel or titanium is preferred. Moreover, in order to give water resistance or corrosion resistance to a steel plate or aluminum plate, it may be one which has undergone coating or coating treatment with coatings or another coating material by means of a commonly practiced method.

Although it may differ depending on its material, if the material of the installation base 20 is stainless steel for example, the preferred thickness is 1.2 mm to 5.0 mm, and more preferably 1.5 mm to 4.0 mm.

In this case, the through holes 28 are separated by a distance L1 between the holes 27 of the fitting 24, and provided in a plurality of lines along the A-B arrow direction orthogonal to the direction between the holes 27. Furthermore, they are provided outside by dimension L2 from line positions P0 of the through holes 28, in a plurality of lines along the A-B arrow direction.

The through holes 28 are long holes which are long in the A-B arrow direction when viewed in the plate surface direction of the installation base 20, and all intervals between the respective through holes 28 in the A-B arrow direction are the same length L3.

In order to fix the electrolytic cell 3 on the installation base 20, first the fittings 24 are fixed on the lower end part of the outer surface of the side plates 22A and 22B of the electrolytic cell 3.

In this case, male screws 30 are inserted through the long holes 26 of the fitting plate part 25a of the fitting 24, and these male screws 30 are screwed into female screw holes (not shown in the figure) which are formed in the outer surface of the side plates 22A and 22B, thereby performing the fixation. When performing this fixation, the holes provided in the fitting 24, through which the male screws 30 are inserted, are the long holes 26. Therefore even if the positions of the male screws 30 to be screwed into the side plates 22A and 22B of the electrolytic cell 3 are different depending on the size of the electrolytic cell 3, by appropriately adjusting the positions of the male screws 30 within the long holes 26, a difference in the position within a certain range can be absorbed, and the fitting 24 can be fixed on the side plates 22A and 22B of various types of electrolytic cell 3.

Next, the electrolytic cell 3 with the above fittings 24 fixed thereon is mounted on the installation base 20, the holes 27 of the fittings 24 are matched with the through holes 28, male screws 32, which constitute the fixture, are inserted from above into the holes 27 and the though holes 28, washers 33 are fitted on the end part of the male screws 32 which project from the back surface side of the installation base 20, and further wing nuts 34 are screwed on and tightened, to thereby complete the fixation.

In this case, even if the lengthwise dimension of the electrolytic cell 3 differs in various ways, fixation of electrolytic cells 3 of various lengths can be performed since the through holes 28 of the installation base 20, through which the male screws 32 are inserted, are long holes, and the through holes 28 are provided in a plurality of lines along the A-B arrow direction.

Figure 4:
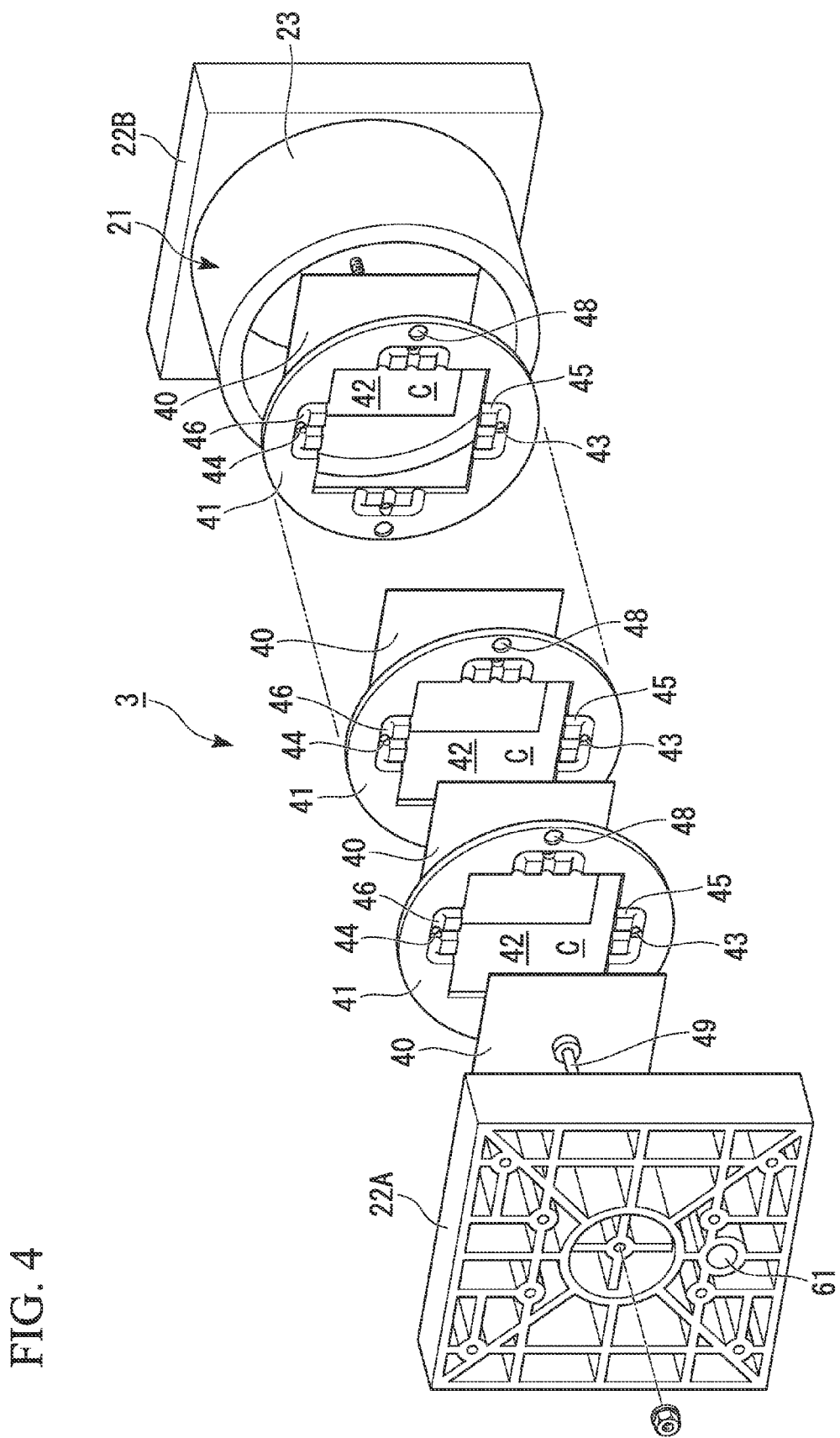
FIG. 4 is an exploded perspective view of the electrolytic cell shown in FIG. 2.
Figure 5:
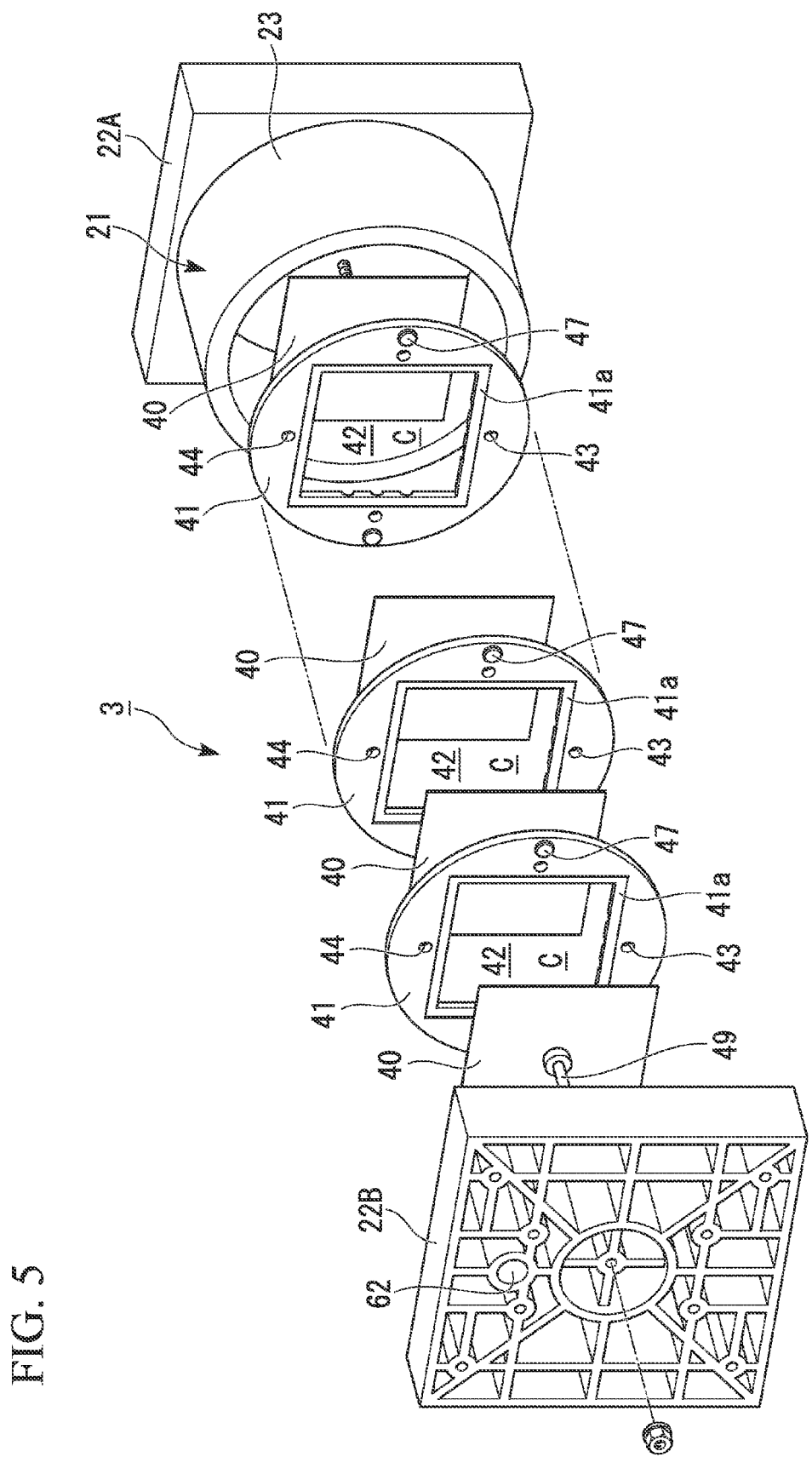
FIG. 5 is an exploded perspective view of the electrolytic cell shown in FIG. 2.
Figure 6:
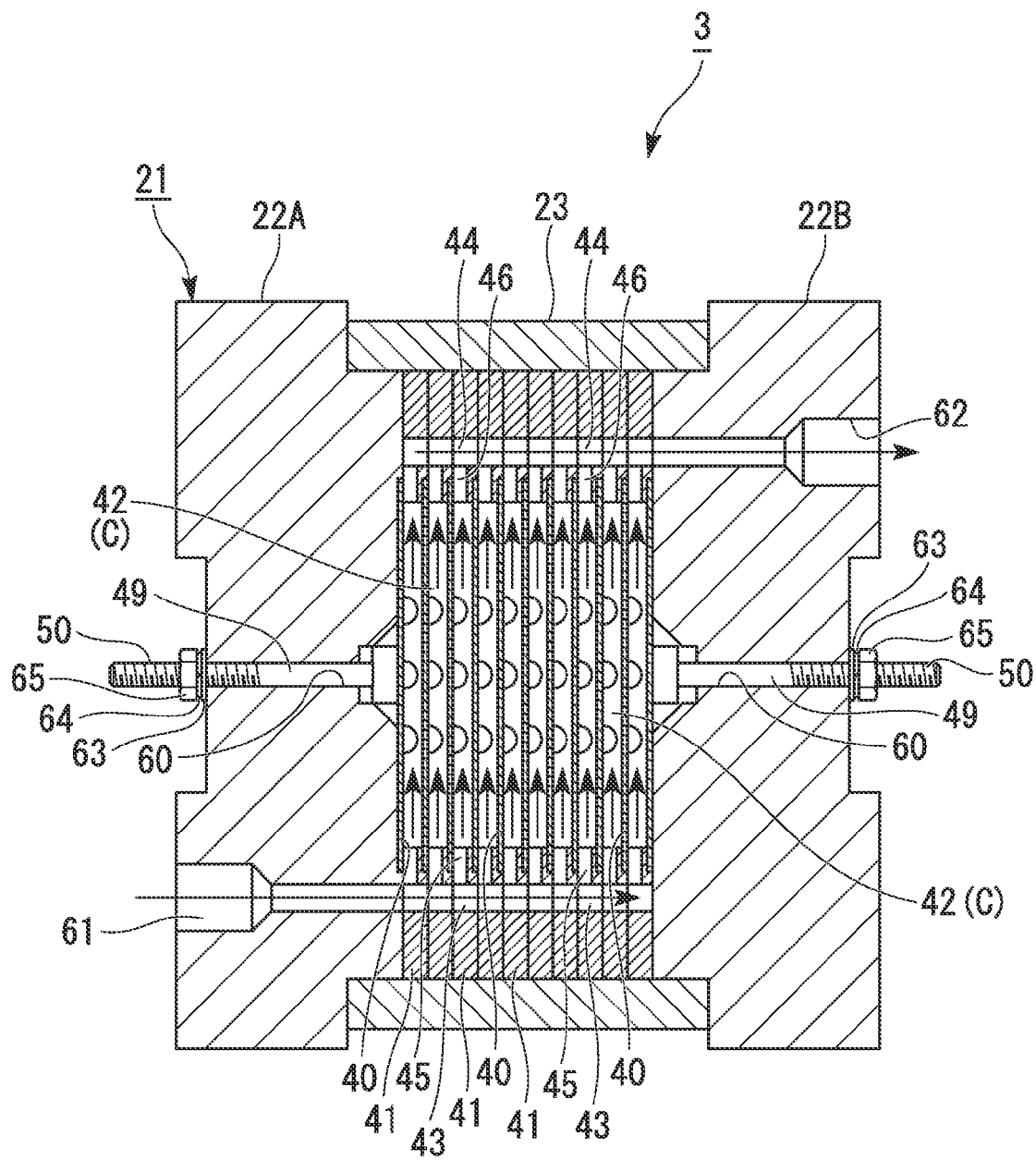
FIG. 6 is a longitudinal sectional view of the electrolytic cell shown in FIG. 2.

FIG. 4 to FIG. 6 are diagrams showing a configuration of the electrolytic cell 3.

The electrolytic cell 3 shown in these diagrams is configured as a bipolar electrolytic cell, and is configured such that inside the casing 21 comprising the side plates 22A and 22B and the casing pipe 23, there are provided a plurality of electrode plates 40 and a plurality of spacers 41 alternately arranged in line along the axial direction of the casing pipe 23.

Each electrode plate 40 is a metallic plate body composed of a titanium alloy or the like, and is formed, for example, in a rectangular (square) shape as shown in the figure. The preferred length of one edge of the rectangular electrode plate is 40 mm to 250 mm, and more preferably 50 mm to 200 mm.

Each spacer 41 is a plate-shaped member formed with a synthetic resin such as polyvinyl chloride, polycarbonate, and it formed for example, in a circular shape so that it can be housed within the pipe type axial body 23. The preferred thickness of the spacer is 1 mm to 10 mm, and more preferably 2 mm to 5 mm.

The respective spacers 41 are arranged so as to be positioned between the respective electrode plates 40. In the center part of the circular plate body of each of these spacers 41, there is formed a rectangular hollow structure 42 passing through in the vertical direction to the plate surfaces (perpendicular). Around the hollow structure 42, there is formed a concavity 41a, and the electrode plate 40 is fitted in the concavity.

Moreover, the spacer 41 has a hole 43 formed in the lower part thereof and a hole 44 formed in the upper part thereof, and these holes 43 and 44 communicate with the hollow structure 42 through grooves 45 and 46. The preferred diameter of the holes of the spacer is 2 mm to 15 mm, and more preferably 3 mm to 12 mm.

The diameter of the upper hole of the spacer may be the same as or may differ from that of the lower hole.

Moreover, the spacer 41 is such that on one of the surfaces thereof, there is formed a convex 47, and on the other surface thereof, there is formed a concavity 48. By fitting the convex 47 with the concavity 48, the respective spacers 41 are connected with each other in a predetermined orientation.

Among the electrode plates 40, in the center part of the electrode plates 40 positioned on both ends, there is fixed a metallic electrode bar 49. The end part of the electrode bar 49 is provided as a male screw part 50 as shown in FIG. 6.

On the other hand, in the side plates 22A and 22B respectively, in the center part thereof, there is formed an electrode through hole 60 which passes therethrough in the thickness direction. In the lower part of the side plate 22A, there is formed an electrolyte solution inlet 61 passing therethrough in the thickness direction, and in the upper part of the side plate 22B, there is formed an electrolyzed product outlet 62 passing therethrough in the thickness direction.

The electrolytic cell 3 comprising the above components is assembled such that the side plates 22A and 22B are arranged so as to oppose each other while having the casing pipe 23 therebetween, the electrode plates 40 and the spacers 41 are alternately arranged inside the casing pipe 23, the electrode bar 49 fixed on the electrode plate 40 closest to the side plate 22A is inserted through the electrode through hole 60 of the side plate 22A, the electrode bar 49 fixed on the electrode plate 40 closest to the side plate 22B is inserted through the electrode through hole 60 of the side plate 22B, a nut 65 is screwed and tightened on the male screw part 50 of each electrode bar 49 while having a washer 63 and a spring washer 64 intervening thereon, and furthermore, the side plate 22A, the casing pipe 23, and the side plate 22B are closely joined with each other.

In this case, each electrode plate 40 is fitted within the concavity 41a of the adjacent spacer 41, and the hollow structure 42 formed by the spacers 41, on both sides thereof in the direction passing therethrough, is covered by the electrode plates 40 thereby forming an independent space. This space forms a unit cell C, in which electrolysis is performed in an electrolyte solution. The preferred volume of each unit cell C is 1.9 ml to 600 ml, and more preferably 3.9 ml to 190 ml.

Moreover, the holes 43 of each spacer 41 communicate with each other while communicating with the inlet 61 of the side plate 22A, and the holes 44 of each spacer 41 communicate with each other while communicating with the outlet 62 of the side plate 22B.

In order to produce electrolyzed products in the above electrolytic cell 3, an electrolyte solution is supplied into the electrolyte solution inlet 61, and this electrolyte solution is delivered to each unit cell C through the holes 43 and the grooves 45 or the like. The electrolyte solution in this case is produced such that hydrochloric acid supplied from the hydrochloric acid tank 2 shown in FIG. 1 to the pipe 8 by the hydrochloric acid pump 9, is diluted with treatment water supplied from the pipes 5 and 6 by the dilution pump 4. When electric power is supplied to the electrode bars 49 each serving as each positive and negative pole in this state, the electrolyte solution is electrolyzed within the unit cell C, and there is thereby produced an electrolyzed product in a state of being a mixture of a gas and liquid or primarily in a state of gas in this unit cell C. The electrolyzed product travels from the unit cell C through the grooves 46 and the holes 44 of the respective spacers 41, and is extracted from the outlet 62.

The electrolyzed product extracted from the outlet 62 is mixed with treatment water in the mixers 13 and 15 shown in FIG. 1, and it is then delivered as electrolysis sterilized water to various places.

In the above electrolytic cell 3, the electrode plate 40 and the spacer 41 are common components each having the same common specification, and by increasing or decreasing the number of these electrode plates 40 and spacers 41, the manufacturing capacity of electrolyzed water can be changed. That is to say, in the case of manufacturing the electrolytic cell 3 with various types of manufacturing capacities of electrolyzed water, the number of the electrode plates 40 and the spacers 41 are set to appropriate numbers for obtaining a required level of electrolyzed products, and the length of the casing pipe 23 may be set according to these numbers. The number of the spacers 41 is usually 1 to 30, and is preferably 6 to 24. The number of the electrode plates 40 may be decided according to the number of the spacers 41.

As described above, the electrolysis water-making apparatus A is to schedule manufacturing at different manufacturing capacities of electrolyzed water, and to prepare for manufacture a plurality of components with different production capacities.

That is to say, as components with different production capacities, water supply lines 1a, 1b, and 1c, electrolytic cells 3a, 3b, and 3c, electrolysis power supplies 11a, 11b, and 11c, and mixers 15a, 15b, and 15c or the like may be arbitrarily prepared.

Moreover, there is provided a configuration of using a common installation base 20 with respect to various types of electrolytic cells, so that various types of electrolytic cells 3 can be installed even if the lengthwise dimensions of the electrolytic cells 3 are different.

That is to say, on the installation base 20 there are provided a plurality of through holes 28 each formed as a long hole at constant intervals in a plurality of lines, so that installation of various types of electrolytic cells 3 is possible.

Furthermore, on this installation base 20, there may be installed various types of electrolysis power supplies 11 with different sizes, as with the electrolytic cells 3.

Moreover, in the present embodiment, the pipes 6, 7, 8, 10, and 12 are configured with flexible pipes. Therefore connection can still be established even if the size of the electrolytic cells 3 or the like is different. In the present embodiment, the pipes 5 and 14 are fixed pipes, however, these may also be configured with flexible pipes.

Furthermore, as for the electrolytic cell 3, by increasing or decreasing the number of the electrode plates 40 and the spacers 41, and by appropriately setting the length of the casing pipe 23, various types of electrolytic cells with different manufacturing capacities of electrolyzed water can be manufactured.

Therefore, according to this electrolysis water-making apparatus A, there can be achieved an effect such that various types of apparatuses with different manufacturing capacities of electrolyzed water can be easily manufactured in a short period of time, and the apparatus can be provided at low cost.

FIG. 7 to FIG. 15 respectively show modified examples of the installation structure of the electrolytic cell 3. Installation structures shown in these FIG. 7 to FIG. 10 respectively take the installation base 20 shown in FIG. 3 as an installation target of the electrolytic cell 3.

Figure 7:
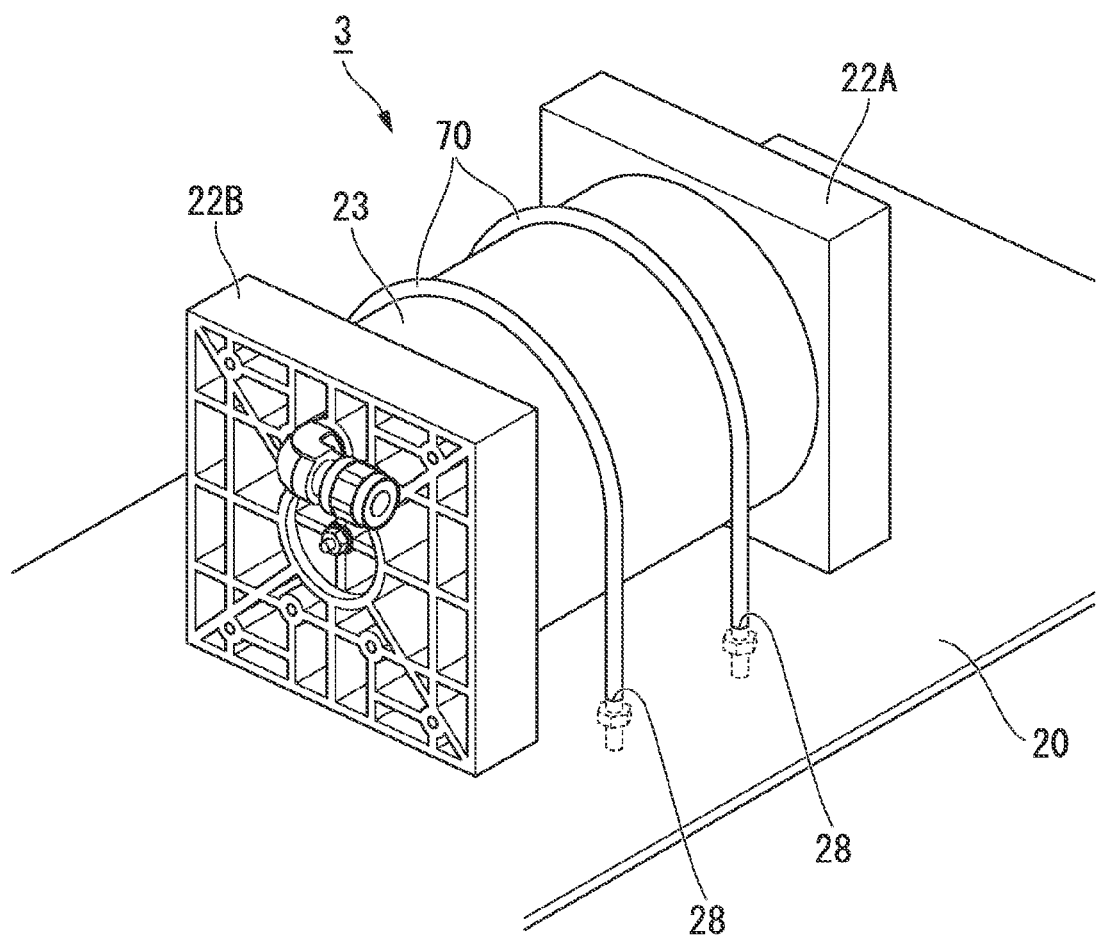
FIG. 7 is a perspective view showing an installation structure of the electrolytic cell shown in FIG. 2, and is a diagram showing a first modified example.

The installation structure shown in FIG. 7 is such that the electrolytic cell 3 is fixed using U-shaped clips 70, which constitute the fixture.

The clip 70 is formed in a U shape, and both of the end parts thereof are provided as being a male screw part (not shown in the figure).

In this installation structure, each curve part of these two clips 70 is locked on the casing pipe 23 of the electrolytic cell 3, both of the end parts each provided as being a male screw part are inserted through the through holes 28 of the installation base 20, a washer is fitted on each male screw part which projects to the back surface side of the installation base 20, and a nut is fitted and tightened thereon, to thereby fix the electrolytic cell 3.

Figure 8:
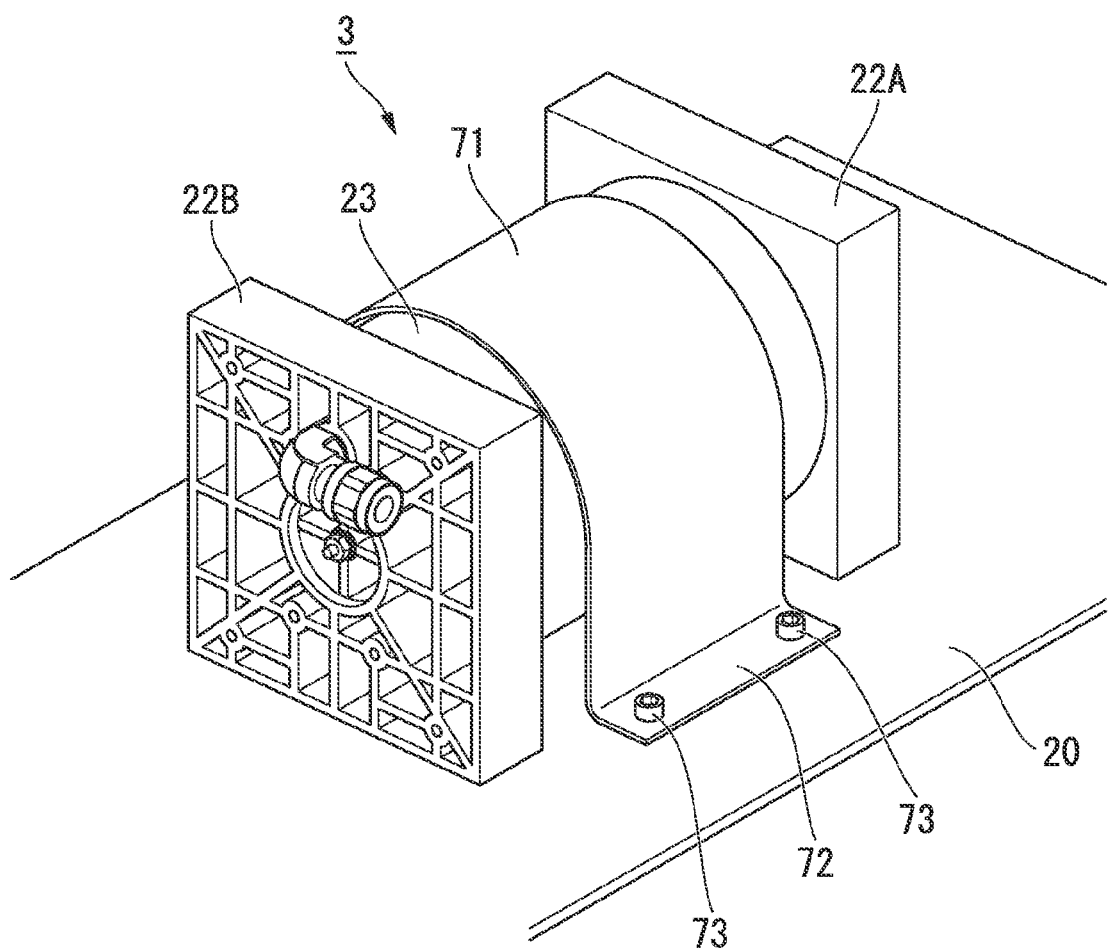
FIG. 8 is a perspective view showing an installation structure of the electrolytic cell shown in FIG. 2, and is a diagram showing a second modified example.

The installation structure shown in FIG. 8 is to fix the electrolytic cell 3 using a fixed material 71 of a belt like structure.

The fixed material 71 is provided such that a belt like plate body is formed in a U shape, a fixed plate 72 projecting outward is formed on both ends thereof, and installation holes are formed in the fixed plate 72.

In this installation structure, the curved part of the fixed material 71 is locked on the casing pipe 23 of the electrolytic cell 3, and the fixed plate 72 is fixed on the installation base 20 using male screws 73 and nuts, which constitute the fixture.

Figure 9:
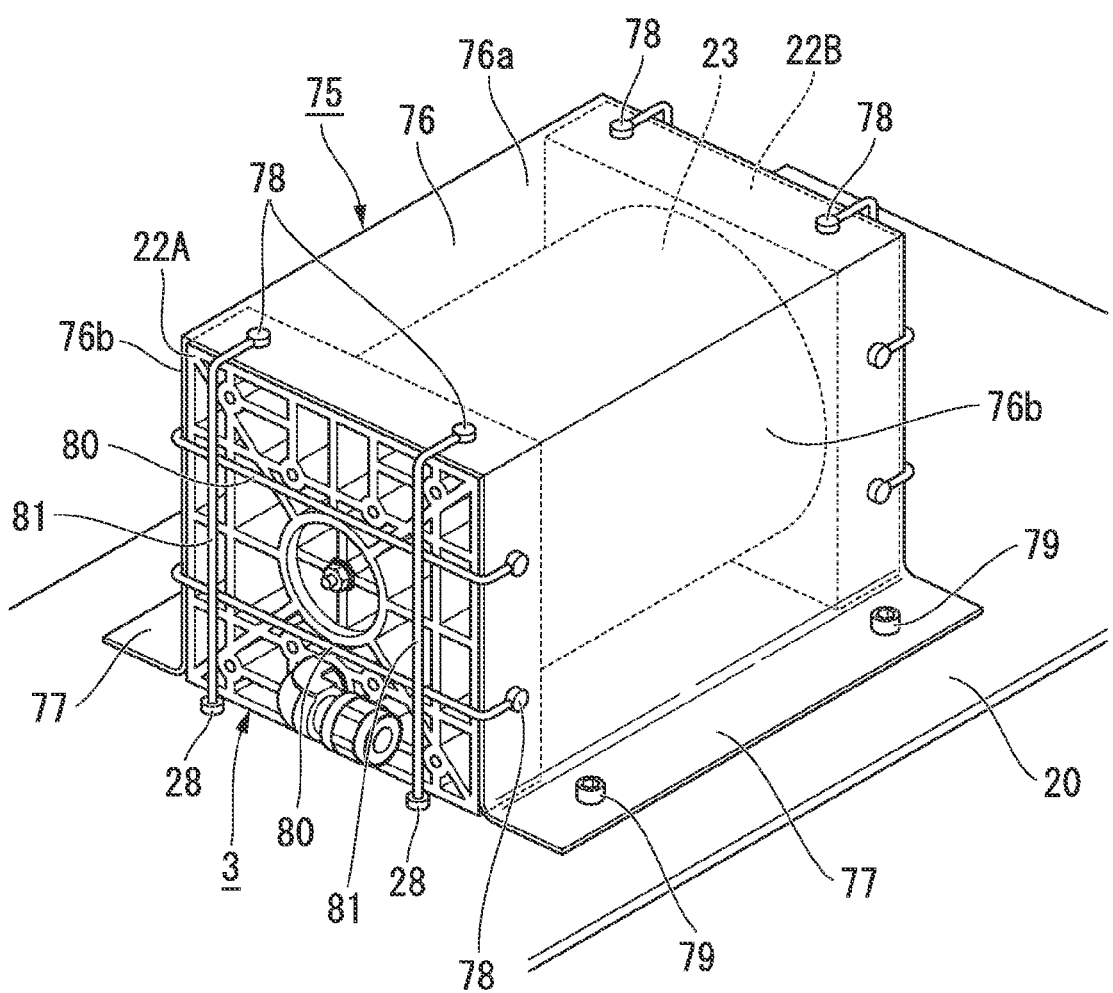
FIG. 9 is a perspective view showing an installation structure of the electrolytic cell shown in FIG. 2, and is a diagram showing a third modified example.

The installation structure shown in FIG. 9 is to fix the electrolytic cell 3 using a fixed material 75.

The fixed material 75 comprises a main body 76 which is bent in a U-shaped type so as to cover the side plates 22A and 22B of the electrolytic cell 3, and a fixed plate 77 which projects outward from this main body 76, and in the fixed plate 77, there are formed installation holes. In this case, the main body 76 comprises a top plate 76a and side plates 76b, and pins 78 are fixed on the side end of each of these parts.

In this installation structure, after having mounted the electrolytic cell 3 on the installation base 20, the fixed material 75 is placed over the entire electrolytic cell 3, and the fixed plate 77 is fixed on the installation base 20 using male screws 79 and nuts which constitute the fixture. Furthermore, linear fixed materials 80 are arranged so as to bridge between the pins 78 of the side plates 76b, one end of a linear fixed material 81 is locked on the pin 78 on the top plate, and the other end is inserted through the through hole 28 to the back surface side of the installation base 20 and it is locked thereon.

Figure 10:
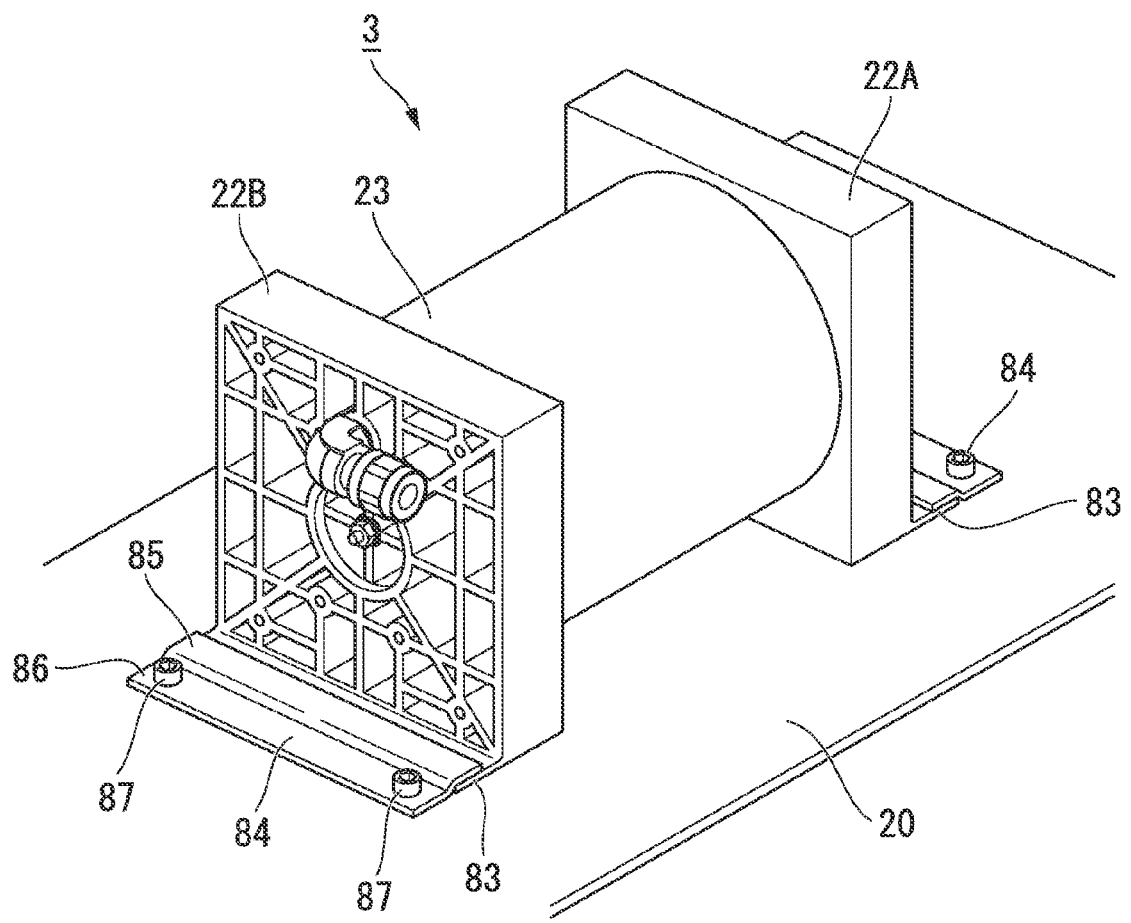
FIG. 10 is a perspective view showing an installation structure of the electrolytic cell shown in FIG. 2, and is a diagram showing a fourth modified example.

The installation structure shown in FIG. 10 is such that a fixed plate 83 which projects outward, is provided on the side plates 22A and 22B of the electrolytic cell 3 first, and this fixed plate 83 is fixed on the installation base 20 using a fixed material 84.

The fixed material 84 comprises a support plate 85 which presses and supports the fixed plate 83, and a fixed plate 86 which continues to this support plate 85, and installation holes are formed in the fixed plate 86.

In this installation structure, having brought the support plate 85 of the fixed material 84 into contact with the upper surface of the fixed plate 83, the fixed plate 86 is fixed on the installation base 20 using male screws 87 and nuts which constitute the fixture.

Figure 11:
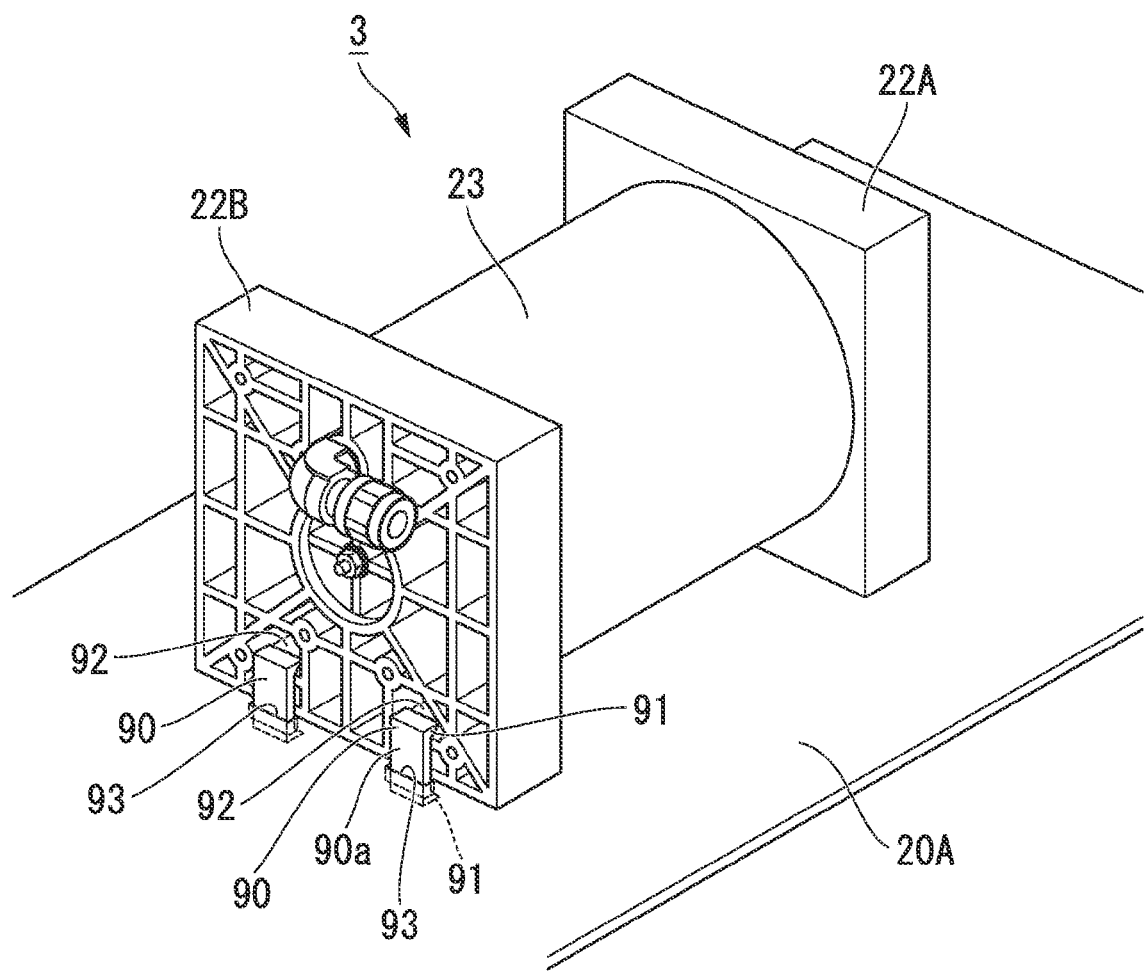
FIG. 11 is a perspective view showing an installation structure of the electrolytic cell shown in FIG. 2, and is a diagram showing a fifth modified example.

The installation structure shown in FIG. 11 is such that a fixture 90 with latching parts 91 provided on upper and lower parts of a plate-shaped main body 90a is used, the latching part 91 on the upper part of this fixture 90 is latched on an opening part 92 formed in the side plates 22A and 22B of the electrolytic cell 3, the main body 90a of the fixture 90 is inserted through a through hole 93 provided in the installation base 20A, and the lower latching part 91 is engaged with the back surface of the installation base 20A.

In this structure, as with the through holes 28 shown in FIG. 3, the through holes 93 are provided in a plurality of lines on the installation base 20A, while the sectional shape of each through hole is formed in a shape which allows the fixture 90 to be inserted therethrough.

Figure 12:
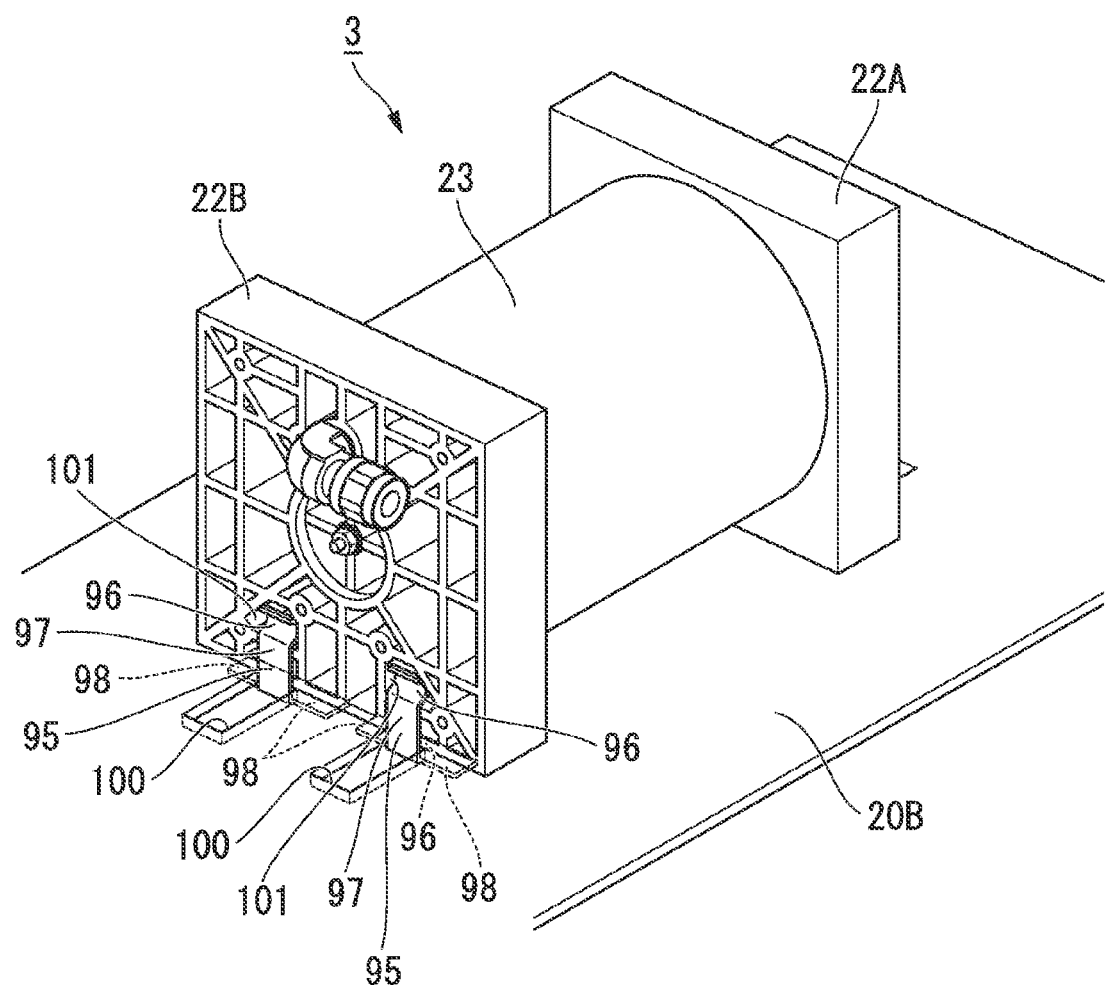
FIG. 12 is a perspective view showing an installation structure of the electrolytic cell shown in FIG. 2, and is a diagram showing a sixth modified example.

The installation structure shown in FIG. 12 is such that as with the above fixture 90 shown in FIG. 11, a fixture 97 with latching parts 96 provided on upper and lower parts of a plate-shaped main body 95 is used, and the fixture 97 has catching plates 98, which project sideward, formed on the lower latching part 96.

Meanwhile, on an installation base 20B on which the electrolytic cell 3 is to be fixed, there are formed through holes 100 each extending long in one direction.

In this installation structure, the fixture 97 is inserted through the through hole 100 from the lower side of the installation base 20B to have the lower catching plates 98 engaged with the back surface side of the installation base 20B, and the upper latching part 96 of the fixture 97 which has reached the front surface side of the installation base 20B is engaged with an opening part 101 formed in the side plates 22A and 22B, to thereby perform fixation of the electrolytic cell 3.

In this structure, by adjusting the position of the fixture 97 within the through hole 100, it is possible to fix various types of the electrolytic cells 3 even if the length of the electrolytic cell 3 is different.

Figure 13:
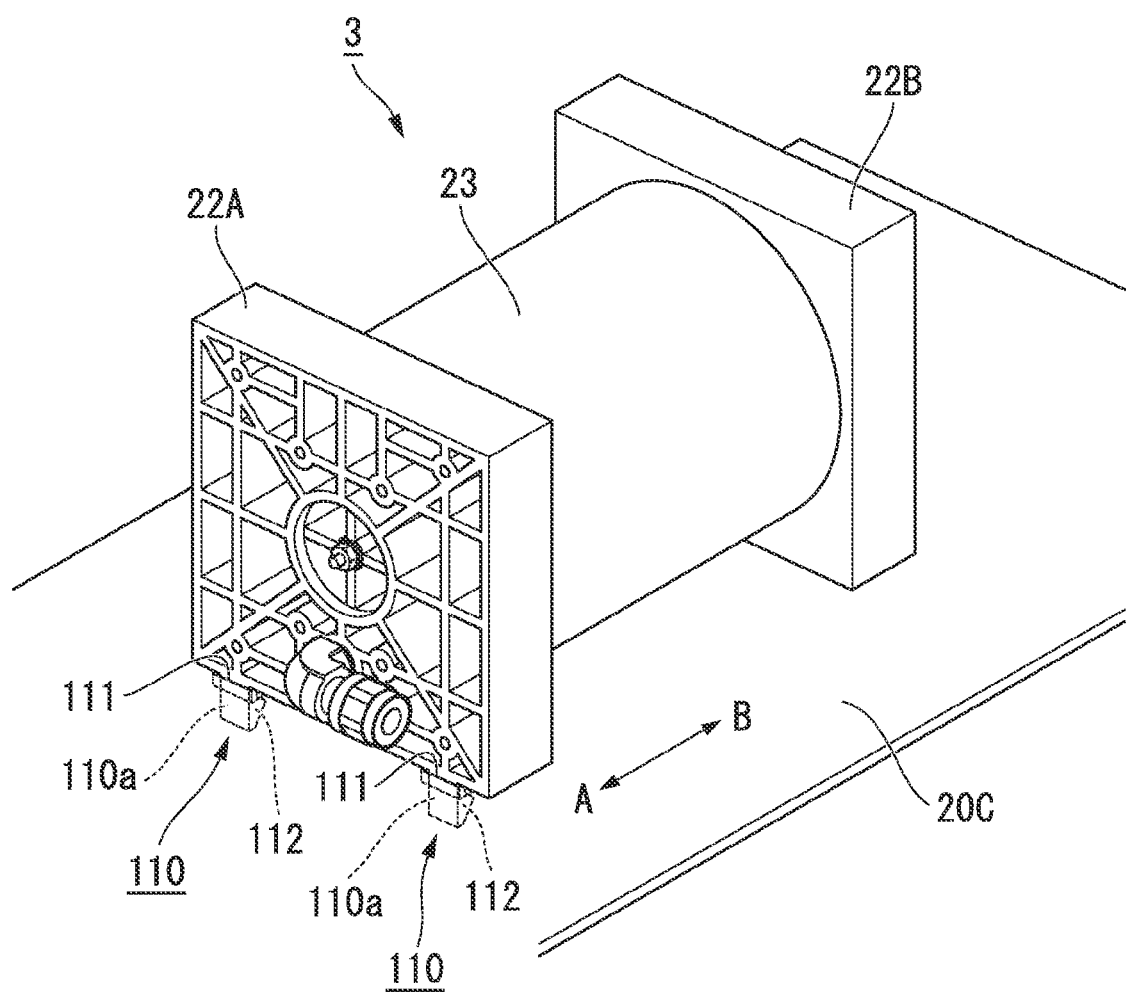
FIG. 13 is a perspective view showing an installation structure of the electrolytic cell shown in FIG. 2, and is a diagram showing a seventh modified example.

The installation structure shown in FIG. 13 is such that an elastically deformable fixture 110 is provided on the lower surface of the side plates 22A and 22B of the electrolytic cell 3, and this fixture 110 is engaged within through holes 111 provided in a plurality of lines on an installation base 20C.

The fixture 110 comprises a plate-shaped main body 110a to be fixed on the side plate 22A (22B), and a clasping projection 112 formed at the lower end of this main body 110a.

In this structure, the main body 110a of the fixture 110 is elastically deformed in the arrow A direction to be inserted into the through hole 111, and then, the main body 110a is elastically returned in the arrow B direction to thereby bring the clasping projection 112 into contact with the lower surface of the installation base 20C.

Figure 14:
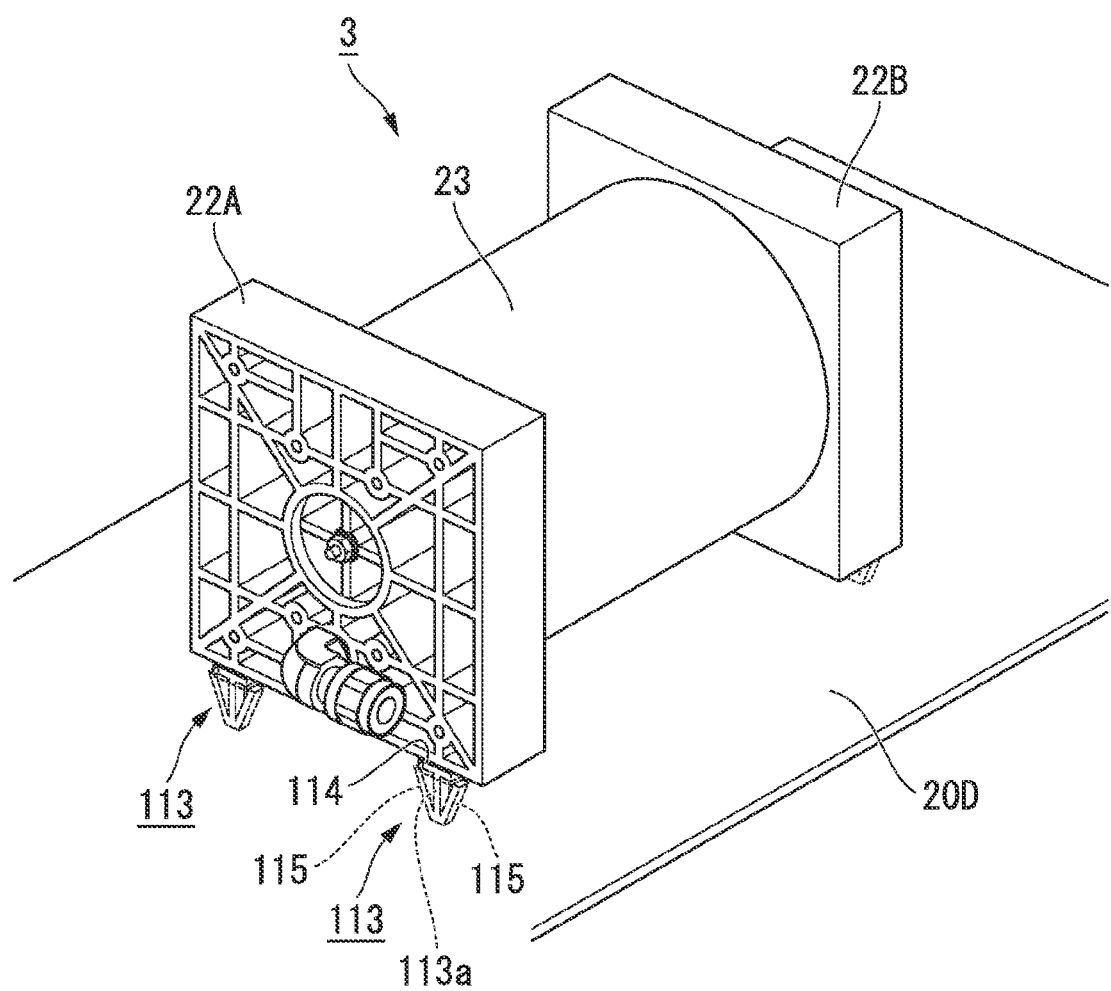
FIG. 14 is a perspective view showing an installation structure of the electrolytic cell shown in FIG. 2, and is a diagram showing an eighth modified example.

The installation structure shown in FIG. 14 is such that a fixture 113 is provided on the lower surface of the side plates 22A and 22B of the electrolytic cell 3, and this fixture 113 is engaged within through holes 114 provided in a plurality of lines on an installation base 20D.

In this structure, the fixture 113 has engaged projections 115 formed so as to gradually expand with upward approach to the lower end part of a plate-shaped main body 113a. The engaged projections 115 are capable of elastic deformation with respect to the main body 113a.

The fixture 113 is inserted into the through hole 114 while the engaged projections 115 are elastically deformed and the upper ends thereof are brought into close proximity to each other, and then the engaged projections 115 are elastically returned to be thereby engaged with the back surface of the installation base 20D.

Figure 15:
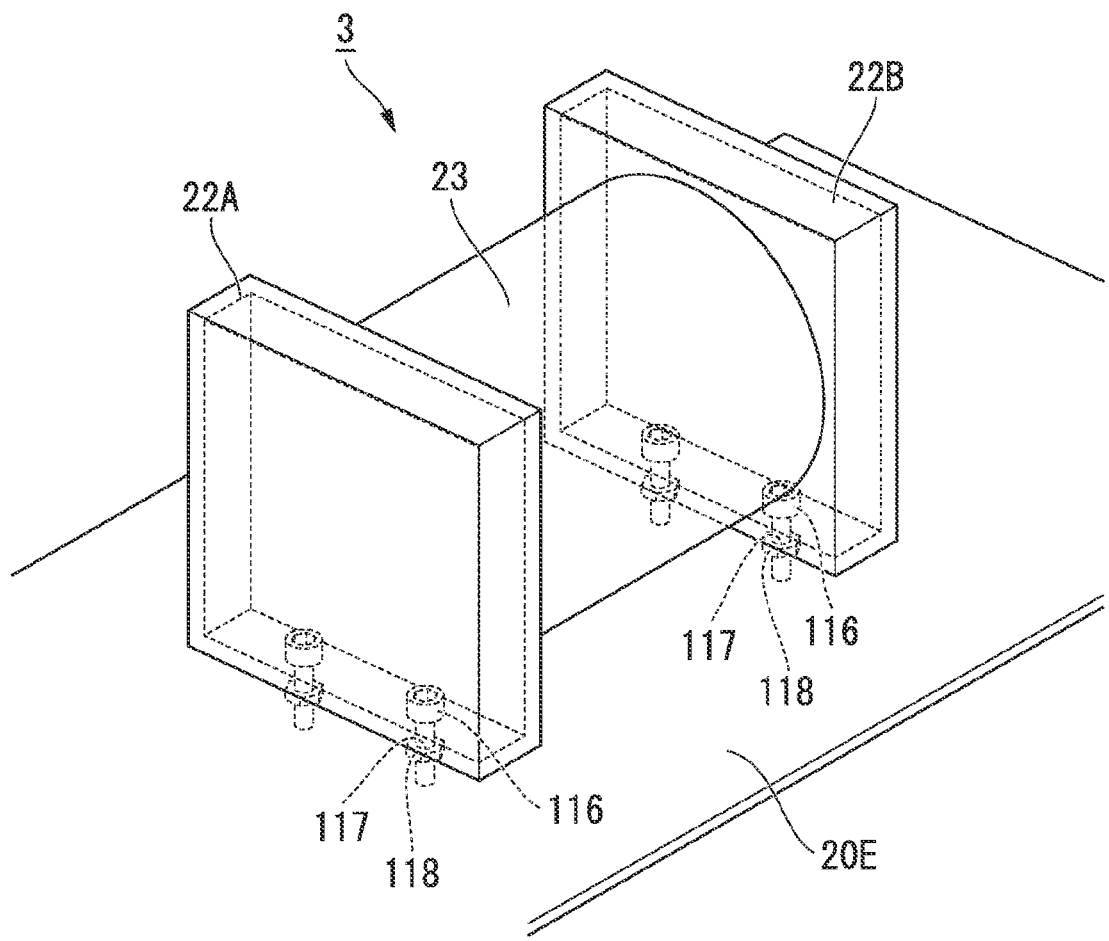
FIG. 15 is a perspective view showing an installation structure of the electrolytic cell shown in FIG. 2, and is a diagram showing a ninth modified example.

The installation structure shown in FIG. 15 is such that a male screw 116 is buried in the lower part of the side plates 22A and 22B of the electrolytic cell 3 so that the lower end part thereof projects downward, the lower end part of this male screw 116 is inserted into a through hole 117 provided in a plurality of lines of an installation base 20E, and a nut 118 is fitted and tightened on the lower end part projecting from the back surface of the installation base 20E.

Figure 16A:
FIG. 16A is a diagram showing a first modified example of a through hole to be formed in the installation base shown in FIG. 3.
Figure 16B:
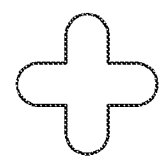
FIG. 16B is a diagram showing a second modified example of a through hole to be formed in the installation base shown in FIG. 3.

In each embodiment above, various types of aspects of through holes to be formed in the installation base have been illustrated. However, in addition to the aspects illustrated in each embodiment above, there may be provided an aspect of providing through holes each in a perfectly circular shape when viewed in the plate-surface direction of the installation base, in a plurality of lines as shown in FIG. 16A, or an aspect of providing it in a cross shape as shown in FIG. 16B. Provided it commonly allows fixation for the aspect of various sizes of the electrolytic cells, then this is sufficient.

Moreover, in the above embodiments, there has been described a case where the length of the electrolytic cell 3 is different, that is, where the length differs depending on the number of electrode plates and spacers according to the manufacturing capacity of electrolyzed water. However, the manufacturing capacity of electrolyzed water of the electrolytic cell 3 may be changed by increasing or decreasing the area of electrode plate. If the area of electrode plates of the electrolytic cell 3 is increased or decreased, the diameter of the casing pipe 23 increases or decreases. Therefore, to match with this type of aspect of the electrolytic cell 3, there may be used through holes 28 formed in the widthwise direction (C-D direction) of the electrolytic cell 3 among the through holes 28 shown in FIG. 3.

Moreover, the installation bases 20, and 20A to 20E are respectively arranged on the lower side of the electrolytic cell 3 to mount and fix the electrolytic cell 3 thereon in the above embodiments. However, there may be provided an aspect such that this type of installation base is rotated 90 degrees about the lengthwise direction so as to stand upright in the perpendicular direction, and the electrolytic cell 3 is fixed on this standing installation base. That is to say, the angle of the installation base may be arbitrary, in other words, the electrolytic cell 3 may be fixed on a side wall, or may even be fixed on a ceiling.

In the electrolysis water-making apparatus of the present invention, conventional techniques commonly known in the technical field of the present invention may be applied to; the water supply system for making electrolyte solutions, the tank for accommodating hydrochloric acid or the like, the mixers, the pumps for pressure-pumping treatment water, hydrochloric acid, and so forth, the pipe group which connects these components of the apparatus, and the electrolysis power supplies for supplying electric power to the electrolytic cell.

INDUSTRIAL APPLICABILITY

According to the electrolysis water-making apparatus of the present invention, even in a case where the size thereof differs depending on the volume of the electrolytic cell, and also in case where the required manufacturing capacity of electrolyzed water differs, each electrolytic cell can be fixed on a common installation base with respect to electrolytic cells of different sizes. Therefore, the electrolysis water-making apparatus can be easily manufactured in a short period of time, and can be provided at low cost.

DESCRIPTION OF THE REFERENCE SIGNS

A: Electrolysis water-making apparatus
1: Water supply line
3, 3a, 3b, 3c: Electrolytic cell
4: Dilution pump
5, 6, 7, 8, 10, 12, 14: Pipe (flexible pipe)
9: Hydrochloric acid pump
20, 20A to 20E: Installation base
21: Casing
22A, 22B: Side plate
23: Casing pipe
26: Long hole
27: Hole
28, 93, 100, 111, 114, 117: Through hole
32, 70, 73, 79, 87, 90, 97, 110, 113: Fixture
41: Spacer
42: Hollow structure (Hollow)

The invention claimed is:

1. An electrolysis water-making system comprising:
a plurality of electrolytic cells different from each other in a size thereof according to their manufacturing capacity, and
an electrolysis water-making apparatus comprising:
one electrolytic cell in which a unit cell is provided in a casing, said one electrolytic cell being selected from the plurality of electrolytic cells different from each other in a size thereof according to their manufacturing capacity;
an installation base to which said one electrolytic cell is fixed by a fixture attached to said one electrolytic cell;
a pipe group through which electrolyte solution is supplied into the one electrolytic cell and electrolyzed products produced in the one electrolytic cell are delivered; and
a chassis, wherein said one electrolytic cell, said installation base and a part of said pipe group are housed within said chassis;
wherein in said installation base, there are provided a plurality of through holes at constant intervals in a lengthwise direction of said one electrolytic cell in a plurality of lines, the plurality of lines of through holes being provided so that any of the plurality of electrolytic cells different from each other in a size thereof according to their manufacturing capacity can be installed on said installation base, and at least two lines of through holes being selectable from the plurality of lines of through holes depending on the size of said one electrolytic cell selected from the plurality of electrolytic cells, through which through holes of said at least two lines end parts of said fixture can be inserted;
the end parts of said fixture are inserted through said through holes, which are selectable from the plurality of through holes of said at least two lines depending on the size of said one electrolytic cell; and
the end parts of said fixture which project from said installation base are locked on said installation base.

2. The electrolysis water-making system according to claim 1, wherein said one electrolytic cell is provided with:
said casing provided with a cylindrical casing pipe and side plates which block both ends of said casing pipe;
a plurality of spacers which are provided in a row along an axial direction in said casing pipe, and which respectively have a hollow structure passing therethrough in said axial direction; and
a plurality of electrode plates which are arranged between each of said plurality of spacers and on an outer side of the spacers positioned at both ends, and which cover said hollow structure to thereby provide the interior thereof as the unit cell.

3. The electrolysis water-making system according to claim 1, wherein at least a part of piping of said pipe group comprises a flexible pipe.

4. The electrolysis water-making system according to claim 1, wherein a shape of at least one through hole of the plurality of through holes is a cross shape.

5. The electrolysis water-making system according to claim 2, wherein at least a part of piping of said pipe group comprises a flexible pipe.

6. The electrolysis water-making system according to claim 2, wherein a shape of at least one through hole of the plurality of through holes is a cross shape.

7. The electrolysis water-making system according to claim 3, wherein a shape of at least one through hole of the plurality of through holes is a cross shape.

8. The electrolysis water-making system according to claim 5, wherein a shape of at least one through hole of the plurality of through holes is a cross shape.

9. The electrolysis water-making system according to claim 1, wherein a shape of at least one through hole of the plurality of through holes is a long hole in the lengthwise direction of said one electrolytic cell, a major axis of the long hole being 6.5 mm to 30.5 mm and a minor axis of the long hole being 3.5 mm to 12.5 mm.

10. The electrolysis water-making system according to claim 1, wherein said constant intervals in the lengthwise direction of said one electrolytic cell is a distance of 6.5 mm to 30.5 mm between periphery parts of adjacent through holes of the plurality of through holes in the lengthwise direction of said one electrolytic cell.

11. The electrolysis water-making system according to claim 10, wherein said constant intervals is a distance of 12.5 mm to 18.5 mm.

* * * * *